United States Patent

[11] 3,593,972

| [72] | Inventors | John Louis Wehrle<br>East Troy;<br>Kenneth William Robinson, Lake Geneva, both of, Wis. |
|---|---|---|
| [21] | Appl. No. | 802,060 |
| [22] | Filed | Feb. 25, 1969 |
| [45] | Patented | July 20, 1971 |
| [73] | Assignee | Crucible Steel Corporation<br>Pittsburgh, Pa. |

[54] ANNEALING APPARATUS
13 Claims, 4 Drawing Figs.

[52] U.S. Cl. ................................................ 266/3
[51] Int. Cl. ................................................ C21d 9/56
[50] Field of Search .................................... 266/3, 4 E;
219/10.61, 544

[56] References Cited
UNITED STATES PATENTS

| 2,594,876 | 4/1952 | Cope | 266/3 |
|---|---|---|---|
| 3,154,440 | 10/1964 | Grimes, Jr. | 266/3 X |
| 3,367,640 | 2/1968 | Russell et al. | 266/3 X |
| 3,368,268 | 2/1968 | Sherman | 266/3 X |
| 3,496,033 | 2/1970 | Gilbreath, Jr. et al. | 266/3 X |

*Primary Examiner*—James M. Meister
*Attorney*—Clair X. Mullen, Jr.

ABSTRACT: This relates to apparatus for the continuous, in-line annealing of elongated metal workpieces, particularly stainless steel tubing, which apparatus includes an induction-heating zone, wherein a workpiece is heated to a predetermined temperature, a soaking zone, wherein said workpiece is held at temperature and a cooling zone, wherein said workpiece is cooled to a temperature below its oxidation temperature. This apparatus provides advantages with respect to product quality and economy of operation.

PATENTED JUL 20 1971
3,593,972
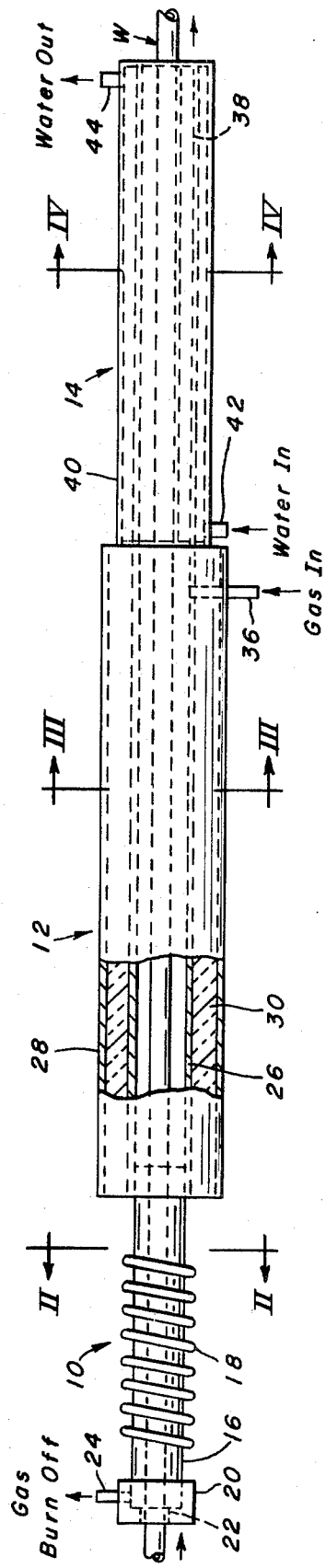
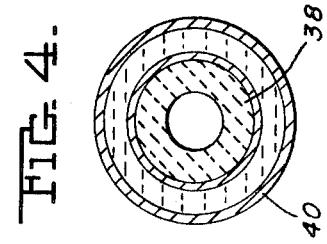
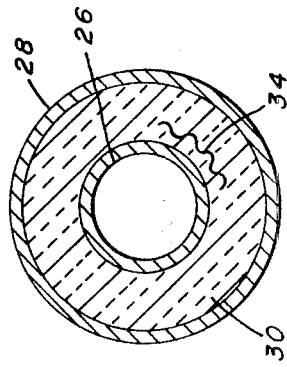
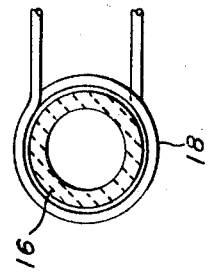
INVENTORS.
JOHN L. WEHRLE &
KENNETH W. ROBINSON
By Clair L. Mullen Jr.
Attorney

ANNEALING APPARATUS

In the manufacture of welded metal tubing, and particularly stainless steel tubing, metal in the form of continuous strip is roll formed progressively from a flat to a tubular form. During this forming, the edges of the strip are bent around until they touch, thus forming a seam. This seam is then joined by a longitudinal welding operation. The metal of the tubing affected by this welding operation takes on an undesirable cast structure. In the case of stainless steel, this structure is characterized by a substantial reduction in corrosion resistance.

It is, therefore, typical practice in the manufacture of welded, stainless steel tubing to subject the tubing to an annealing treatment, wherein the tubing is heated for a time at temperature sufficient to permit recrystallization of the metal. For this purpose, prior to the present invention, it was customary to transport a quantity of such tubing from the welding area to a separate gas-fired annealing furnace. With this practice, however, the material was many times required to be maintained within the furnace for times in excess of that necessary for recrystallization. More important, however, distortion of the tubing occurred within the furnace, which required a subsequent straightening operation that adds considerably to the manufacturing costs of the tubing.

It is accordingly an object of the present invention to provide apparatus for annealing elongated material, and particularly stainless steel tubing, that eliminates many of the disadvantages characterizing conventional practices for this purpose.

Another more specific object of the invention is to provide an apparatus for annealing stainless steel tubing that can perform this function in-line with the customary roll-forming and longitudinal welding apparatus, whereby product handling and transfer are reduced over conventional practice.

Yet another more specific object of the invention is to provide for the in-line annealing of stainless steel tubing in a manner that produces uniform, progressive heating along the length of the tubing, whereby tubing distortion is minimized to in turn minimize the straightening required for the final product.

Still another specific object of the invention is to provide apparatus for in-line annealing of stainless steel tubing that provides protection for the tubing against oxidation during heating to recrystallization temperature and until the tubing is at a temperature below its oxidation temperature, whereby scale formation on the tubing is minimized to in turn minimize scale removal as by pickling in acid solutions.

These and other objects of the invention as well as a complete understanding thereof may be obtained from the following description and drawings, in which:

FIG. 1 is an elevation in partial section of apparatus in accordance with the invention;

FIG. 2 is a sectional view taken along lines II—II of FIG. 1;

FIG. 3 is a sectional view taken along lines III—III of FIG. 1; and

FIG. 4 is a sectional view taken along lines IV—IV of FIG. 1

Broadly, the apparatus of the invention comprises an in-line induction heating zone through which tubing may be passed after welding. In this zone the tubing is maintained in a nonoxidizing atmosphere and is heated to a predetermined temperature, which typically may be the recrystallization temperature, preferably by means of an induction-heating coil that surrounds the chamber of this zone through which the tubing passes. Upon reaching temperature, the tubing next enters a soaking zone. In this zone the tubing is held at temperature, typically for a time sufficient to permit recrystallization. A nonoxidizing atmosphere is also provided within this zone. For this purpose an inert or reducing gas, such as hydrogen or helium, may be introduced adjacent the tubing-exit end of the soaking zone and flow countercurrent to tubing movement to an exit port adjacent the tubing-entry end of the induction heating zone. Upon emergence from the soaking zone the tubing enters a cooling zone, which is constructed from a heat-conductive, nonabrasive material, such as graphite. Surrounding the graphite or other material adjacent the tubing is a cooling jacket through which a coolant, such as water, is circulated for cooling the tubing to a temperature below that at which oxidation will occur. Upon emergence from the cooling zone the tubing is below oxidation temperature, and thus it may be further cooled to handling temperature by directly contacting it with cooling water without substantial formation of scale. By use of an induction heating coil, uniform heat application may be provided to minimize distortion of the tubing. Also the protective atmosphere within which the tubing is maintained while it is above oxidation temperature eliminates scale formation. The fact that the operation is performed by apparatus that may be positioned in-line with the conventional roll forming and welding apparatus reduces the additional handling typically incident to the conventional annealing operation as described hereinabove. If necessary, it is also possible to employ within the soaking zone supplemental heating means. This may typically be required in operations wherein the metal of the tubing requires high temperature for recrystallization or where it is not feasible to use sufficient insulation to maintain the desired temperature in the absence of supplemental heating.

With reference to the drawings, and for the present to FIG. 1 thereof, there is shown apparatus in accordance with the invention, which comprises an induction heating zone, indicated generally by the numeral 10, a soaking zone, indicated generally by the numeral 12, and a cooling zone, indicated generally by the numeral 14. As may be seen from FIG. 1 these three zones are in-line. In a typical installation for the manufacture of welded stainless steel tubing this apparatus would be positioned in-line with and immediately after the conventional longitudinal welding apparatus (not shown). In this manner immediately after welding the tubing would pass into the induction heating zone 10 for annealing. The workpiece, which is typically tubing constructed of stainless steel, is indicated as W in FIG. 1. The workpiece W moves through the induction heating zone 10, the soaking zone 12 and the cooling zone 14 from left to right, as viewed in FIG. 1, in the direction of the arrow.

The induction heating zone 10 consists of a chamber 16 in the form of a tube. The chamber 16 is constructed from a heat-resistant, nonelectrically conducting material, such as a suitable ceramic or quartz. Surrounding the chamber 16 is a conventional water-cooled induction-heating coil 18. The coil 18 is adapted, when energized, to heat tubing passing through the chamber 16 to a predetermined temperature, which in some typical applications will be above its temperature of recrystallization. Typically, in the case of stainless steel this temperature will be within the range of about 1,900° to 2,200° F. Typically, the tubing movement through the chamber 16 of the induction-heating zone, as well as the following zones, is at a speed of about 40 to 200 inches per minute. Adjacent tubing-entry end of the chamber 16 there is provided a fitting 20. The fitting 20 is preferably readily removable and provides a restricted opening 22 for entry of the tubing into the chamber 16. The opening 22 is made only slightly larger than is necessary to permit entry of the tubing, and is thus selected in accordance with the tubing diameter, for the purpose of minimizing the air entering the chamber 16 with the tubing. This serves to maintain the desired nonoxidizing atmosphere, which is provided within the induction-heating zone in a manner described in detail hereinafter. Also, adjacent the entry end of the chamber 16 is provided a gas outlet port 24 for escape of used gas supplied to maintain the required nonoxidizing atmosphere within the chamber 16.

The soaking zone 12, which is in line with the induction heating zone 10, comprises an interior metal tubing 26 surrounded by a coextensive, larger-diameter concentric metal tubing 28. Between the tubing 26 and 28 is provided heat-insulating material 30. The insulating material 30 may be any of the well known heat insulators that may be in a form suitable to apply between the tubing 26 and 28, such as glass wool or fused, stabilized zirconia. The purpose of the heat-insulating material 30 is to maintain the tubing W for a time at the desired temperature. For this purpose, supplemental heating may be supplied by providing resistance heating elements, as indicated by the numeral 34 in FIG. 3, embedded within the heat-insulating material 30. Adjacent the exit end of the soaking zone is provided a gas inlet port 36. A reducing or inert gas, such as hydrogen or helium, is introduced through the port 36; it flows through the tubing 26 of the soaking zone countercurrent to the direction of tubing travel and into and through the chamber 16 of the induction-heating zone 10. The gas leaves the chamber 16 through the gas exit port 24. Preferably to prevent an explosion hazard when hydrogen is used it is preferred to combust this gas as it leaves the exit port 24.

The tubing leaving the soaking zone 12 next enters the cooling zone 14. As best shown in FIG. 4, the cooling zone 14 consists of a graphite tube 38 surrounded by a water jacket 40. By means of water inlet port 42 and water outlet port 44 water is continuously circulated through the water jacket 40. The inside diameter of the graphite tube 38 is only slightly larger than the outside diameter of the tubing. This, in combination with the high heat-conducting properties of the graphite, serves to rapidly cool the tubing. Because the interior dimension of the graphite tube 38 is only slightly greater than the tubing diameter, contact may periodically occur during movement of the tubing through the cooling zone. The fact that the graphite tube interior provides a smooth nonabrasive surface minimizes marring of the stainless steel tubing resulting from contact with the interior of the graphite tube 38. The stainless steel tubing upon emergence from the cooling zone is at a temperature below its oxidation temperature, which for stainless steel is typically a temperature of 800° F. or less. Since the tubing is below oxidation temperature upon its initial exposure to the air scaling is substantially eliminated. For purposes of handling, water may be sprayed directly onto the tubing as it emerges from the cooling zone to lower its temperature still further. Although the tube 38 of the cooling zone 14 has been described and shown as graphite, it is to be understood that any material that has the combination of high heat transfer and a smooth nonabrasive surface finish may be employed.

Although various embodiments of the invention have been shown and described herein it is obvious that other adaptations and modifications may be made by those skilled in the art without departing from the scope and spirit of the appended claims.

We claim:

1. Apparatus for the continuous, in-line annealing of an elongated metal workpiece in the form of a tube comprising induction-heating, soaking and cooling zones through which said workpiece is sequentially passed; said induction-heating zone including a first chamber having a nonoxidizing atmosphere and constructed from a heat-resistant, nonelectrically conducting material surrounding and electrically insulating said workpiece from induction heating means adapted to heat said workpiece to a predetermined temperature during its passage through said chamber; said soaking zone including a second chamber enclosing said workpiece and provided with heat-insulating material to maintain the temperature of said workpiece above a predetermined temperature during passage through said second chamber and having a nonoxidizing atmosphere; said cooling zone including a third chamber constructed from a heat-conductive, nonabrasive material having an interior configuration conforming substantially to said workpiece wherein said workpiece is cooled to a temperature below its temperature of oxidation.

2. The apparatus of claim 1 wherein said chambers are in axial alignment.

3. The apparatus of claim 1 wherein said nonoxidizing atmosphere is provided in said first and second chambers by circulating an inert gas through said chambers countercurrent to said workpiece travel.

4. The apparatus of claim 1 wherein the heat-conductive, nonabrasive material of said third chamber is surrounded by a cooling jacket through which a fluid coolant is circulated to facilitate heat removal from said workpiece during passage through said third chamber.

5. The apparatus of claim 1 wherein said heat-conductive, nonabrasive material of said third chamber is graphite.

6. The apparatus of claim 1 wherein the material of said first chamber is ceramic.

7 The apparatus of claim 1 wherein the induction-heating means is an induction coil surrounding said first chamber.

8. The apparatus of claim 1 wherein said workpiece is stainless steel tubing.

9. The apparatus of claim 1 wherein means are provided at a workpiece entry end of said first chamber to minimize air entering the chamber with the workpiece.

10. The apparatus of claim 1 wherein said soaking zone has heating means adapted to provide supplemental heat to said workpiece during passage through said soaking zone to maintain the temperature of said workpiece above said predetermined temperature.

11. The apparatus of claim 1 wherein said soaking zone comprises an interior metal tube surrounding said workpiece and around the exterior of which is provided said heat insulating material.

12. The apparatus of claim 11 wherein a resistance heating element is provided within said heat-insulating material.

13. The apparatus of claim 1 wherein a gas entry port is provided in said soaking zone for the introduction thereto of gas to provide said nonoxidizing atmosphere, which gas flows through said soaking zone, countercurrent to workpiece travel, and into said induction heating zone where it is released to the atmosphere through a gas exit port provided in said induction-heating zone.